(12) United States Patent
Fujisaki et al.

(10) Patent No.: US 8,875,164 B2
(45) Date of Patent: Oct. 28, 2014

(54) INFORMATION PROCESSING APPARATUS AND METHOD FOR CONTROLLING INFORMATION PROCESSING APPARATUS

(71) Applicant: Fujitsu Limited, Kawasaki (JP)

(72) Inventors: Naoya Fujisaki, Yokohama (JP); Naoki Nishiguchi, Kawasaki (JP); Masahide Noda, Kawasaki (JP); Masatomo Yasaki, Kako (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/960,468

(22) Filed: Aug. 6, 2013

(65) Prior Publication Data

US 2014/0075456 A1 Mar. 13, 2014

(30) Foreign Application Priority Data

Sep. 10, 2012 (JP) ................................. 2012-198046

(51) Int. Cl.
*G06F 13/00* (2006.01)
*G06F 9/445* (2006.01)
*G06F 9/54* (2006.01)
*G06F 9/44* (2006.01)

(52) U.S. Cl.
CPC .............. *G06F 9/445* (2013.01); *G06F 9/4425* (2013.01); *G06F 9/547* (2013.01)
USPC ........................................................ 719/330

(58) Field of Classification Search
CPC ...................................................... G06F 9/547
USPC .......................................................... 719/330
See application file for complete search history.

(56) References Cited

U.S. PATENT DOCUMENTS 7,028,312 B1 * 4/2006 Merrick et al. ............... 719/330
7,624,404 B2 * 11/2009 Yagi .............................. 719/330

FOREIGN PATENT DOCUMENTS

JP 11-212931 8/1999
JP 2004-341999 12/2004

* cited by examiner

*Primary Examiner* — Andy Ho
(74) *Attorney, Agent, or Firm* — Staas & Halsey LLP

(57) ABSTRACT

An information processing apparatus includes a storage that stores first information and second information, the first information associating a content of a call to be issued from a first application with information on whether to cause a user to select any of second applications, the second information associating the content of the call to be issued from the first application with any of the second applications, and a processor that is configured to receive a call issued from the first application, determine whether the received call is associated with information to cause the user to select any of the second applications based on the first information, specify the second application associated with a content of the received call based on the second information when the received call is determined to be associated with the information to cause the user to select the second applications, and execute the specified second application.

8 Claims, 19 Drawing Sheets

FIG. 6

PACKAGE MANAGEMENT TABLE 112

| PACKAGE NAME | PROGRAM INFORMATION | RESOURCE INFORMATION | MANIFEST INFORMATION | SIGNATURE INFORMATION |
|---|---|---|---|---|
| jp.abc.gyoumu.kaikei.A | ./A/, Aapp.jar, comm.jar | ./A/, gyoumu.png, entry.png | INPUTMETHOD : PERMISSION OF USE OF SOFTWARE KEYBOARD AND INTENT<br>PHONE : PERMISSION OF USE OF PHONE AND INTENT<br>KERNEL REVISION NUMBER ENSURING OPERATIONS: 2.0.0 OR GREATER | DEVELOPER A |
| jp.abc.gyoumu.houkoku.B | ./B/, Bapp.jar, comm.jar | ./B/, houkoku.png, entry.png | INPUTMETHOD : PERMISSION OF USE OF SOFTWARE KEYBOARD AND INTENT<br>CAMERA : PERMISSION OF USE OF CAMERA AND INTENT | DEVELOPER B |
| jp.xyz.app.C | ./C/, app.jar | ./C/, app.jar | — | DEVELOPER C |
| ... | ... | ... | ... | ... |
| com.pkg.openwnn | ./openwnn/, | ./openwnn/, | ... | DEVELOPER X |
| com.pkg.input | ./input/, | ./input/, | ... | DEVELOPER X |
| com.pkg.phone | ./phone/, | ./phone/, | ... | DEVELOPER X |
| com.pkg.camera | ./camera/, | ./camera/, | ... | DEVELOPER X |
| ... | ... | ... | ... | ... |

FIG. 7

| CATEGORY MANAGEMENT TABLE ||
|---|---|
| CATEGORY | URI OF CALL DESTINATION APPLICATION |
| INPUTMETHOD | com.pkg.openwnn |
| | com.pkg.input |
| | osxx.pkg.keyboard |
| | ... |
| PHONE | com.pkg.phone |
| | ... |
| CAMERA | com.pkg.camera |
| | ... |
| ... | ... |

| INTENT SELECTION DATA | | | | |
|---|---|---|---|---|
| URI OF CALL SOURCE APPLICATION | ACTION | CATEGORY | URI OF CALL DESTINATION APPLICATION | |
| jp.xxx.app.X | ACTION_EDIT | INPUTMETHOD | com.pkg.openwnn | ←114-1 |
| jp.yyy.app.Y | ACTION_EDIT | INPUTMETHOD | – | ←114-2 |

FIG. 9

| PROFILE TABLE | | | 121 |
|---|---|---|---|
| PROFILE ID | PROFILE CHARACTERISTIC NAME | PREFIX | |
| PROF-A | CURRENT ENVIRONMENT | com.osxx.* | |
| PROF-B | PREVIOUS ENVIRONMENT | com.osxx.example.* | |
| ... | ... | ... | |
| PROF-1 | INDIVIDUAL | com.private.* | |
| PROF-2 | COMPANY | jp.abc.gyoumu.houkoku.* | |
| PROF-3 | COMPANY | jp.abc.gyoumu.kaikei.* | |
| ... | ... | ... | |

FIG. 10

SECURITY MEASURES TABLE

| PROFILE CHARACTERISTIC NAME | SIGNATURE INFORMATION | PERMITTED APPLICATIONS | | | | | |
|---|---|---|---|---|---|---|---|
| | | ACTION_EDIT | | | ACTION_MAIN | | |
| | | INPUTMETHOD | ... | PHONE | ... | CAMERA | ... |
| DEFAULT | DEVELOPER Y | osxx.pkg.keyboard osxx.pkg.input | ... | osxx.pkg.phone | ... | osxx.pkg.camera | ... |
| COMPANY | DEVELOPER X | com.pkg.openwnn | ... | com.pkg.phone | ... | com.pkg.camera | ... |
| ... | ... | ... | ... | ... | ... | ... | ... |

FIG. 11

| LINK MANAGEMENT TABLE | | | 123 |
| --- | --- | --- | --- |
| URI OF CALL SOURCE APPLICATION | ACTION | CATEGORY | URI OF CALL DESTINATION APPLICATION |
| jp.abc.gyoumu.kaikei.A | ACTION_EDIT | INPUTMETHOD | com.pkg.openwnn |
| | ACTION_MAIN | PHONE | com.pkg.phone |
| jp.abc.gyoumu.houkoku.B | ACTION_EDIT | INPUTMETHOD | com.pkg.openwnn |
| | ACTION_MAIN | CAMERA | com.pkg.camera |
| ... | ... | ... | ... |

# INFORMATION PROCESSING APPARATUS AND METHOD FOR CONTROLLING INFORMATION PROCESSING APPARATUS

CROSS-REFERENCE TO RELATED APPLICATION

This application is based upon and claims the benefit of priority of the prior Japanese Patent Application No. 2012-198046, filed on Sep. 10, 2012, the entire contents of which are incorporated herein by reference.

FIELD

The embodiments discussed herein are related to an information processing apparatus, and a method for controlling the information processing apparatus.

BACKGROUND

An information processing device such as a computer or a mobile terminal device executes software of various types. Software that is executed on the information processing device calls other software in some cases. For example, in order to enable a user to enter characters in certain software, the certain software may call other software that supports the character entry of the user.

A method for supporting coordination between software has been considered. For example, there is a proposal in which a service that is provided by a program and information such as a command that is executed in the service are acquired for each of programs, and when a request for a function to be used is received from a client program, a server program that provides the function is searched and a response is provided.

In addition, there is a proposal in which a table is prepared, in which identification information of an action and identification information of an application for which the action is executed are registered and associated with identification information of an event and identification information of an application that has generated the event. According to the proposal, when an even is generated by a certain application, a corresponding action is controlled and thereby executed on a target application on the basis of the table.

Japanese Laid-open Patent Publications Nos. 11-212931 and 2004-341999 are examples of related art.

SUMMARY

According to an aspect of the invention, an information processing apparatus includes a storage that stores first information and second information, and a processor. The first information associates a content of a call to be issued from a first application with information whether to cause a user to select any of a plurality of second applications. The second information associates the content of the call to be issued from the first application with any of the second applications. The processor is configured to receive a call issued from the first application, determine whether the received call is associated with information to cause the user to select any of the second applications based on the first information, specify the second application associated with a content of the received call based on the second information when the received call is determined to be associated with the information to cause the user to select any of the second applications, and execute the specified second application.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a package management table according to the second embodiment;

FIG. 7 is a diagram illustrating an example of a category management table according to the second embodiment;

FIG. 8 is a diagram illustrating an example of intent selection data according to the second embodiment;

FIG. 9 is a diagram illustrating an example of a profile table according to the second embodiment;

FIG. 10 is a diagram illustrating an example of a security measures table according to the second embodiment;

FIG. 11 is a diagram illustrating an example of a link management table according to the second embodiment;

DESCRIPTION OF EMBODIMENTS

Any of a plurality of call destinations that are software may be selected by a user for a call from a call source that is software. For example, when a call that specifies an "input support" function is provided, any of multiple types of software for supporting entries of characters and the like may be selected by the user. For this method, a call process may be implemented during development of a call source that is software without specifying a call destination that is software in advance. Thus, a load on the development may be reduced, compared with the case where a call destination that is software is specified in advance.

This method, however, has a problem with security. Among software that is candidates for a call destination, software may execute a malicious process. For example, among software that has the "input support" function, software may transmit input data to another device through a network. If the software is selected by a user, private information of the user, confidential information, or the like may leak.

Thus, there is a problem how to achieve a high-security method while achieving a call that specifies a certain function and suppressing selection of malicious software by a user.

Hereinafter, the embodiments are described with reference to the accompanying drawings. Software may be an application.

First Embodiment

Figure 1:
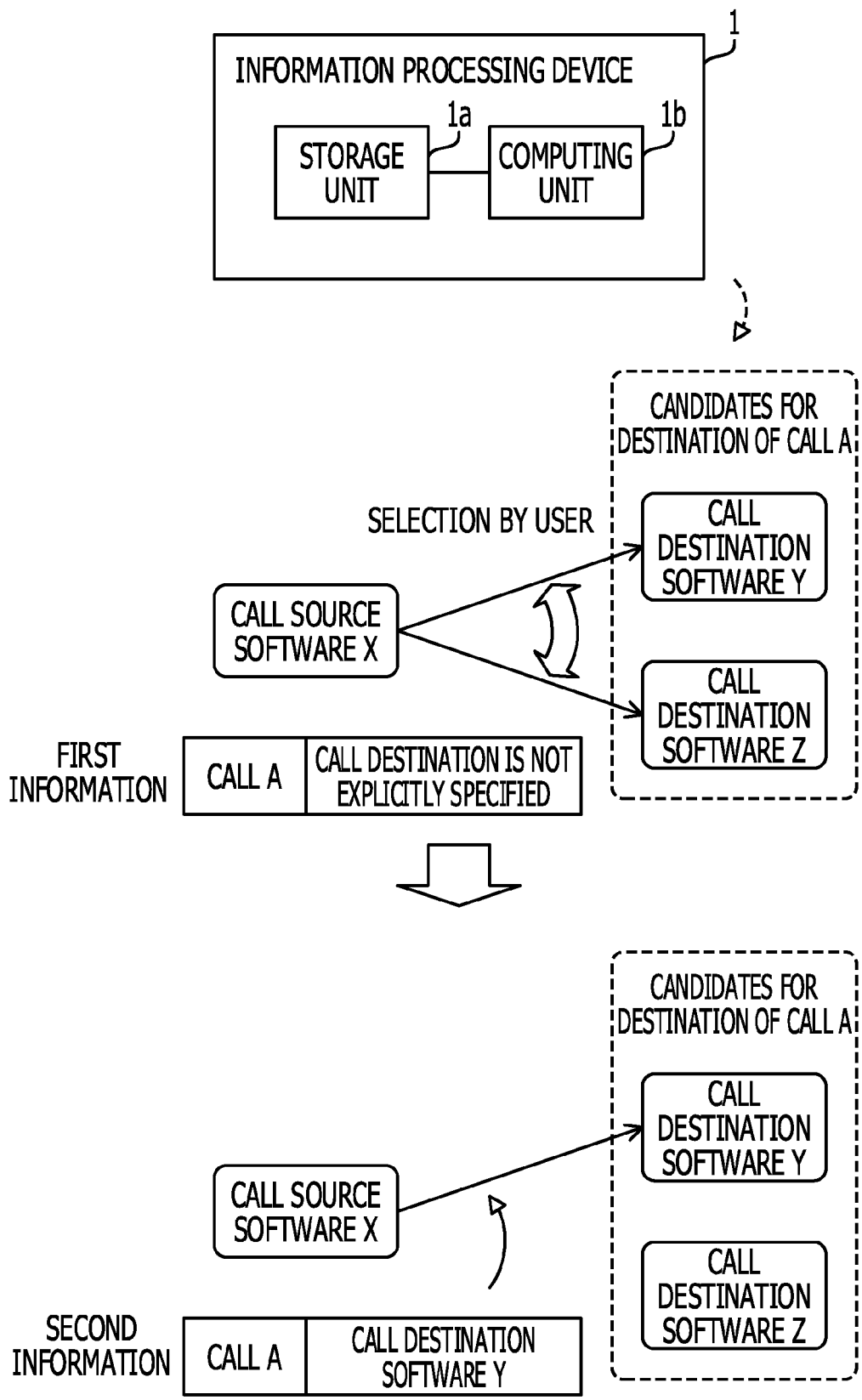
FIG. 1 is a diagram illustrating an information processing device according to the first embodiment.

FIG. 1 is a diagram illustrating an information processing device 1 according to the first embodiment. The information processing device 1 is a computer, a mobile terminal device, or the like. The information processing device 1 includes a storage unit 1a and a computing unit 1b. The storage unit 1a is a memory such as a random access memory (RAM), for example. The computing unit 1b is a processor such as a central processing unit (CPU), for example. Information processing according to the first embodiment may be achieved by causing the computing unit 1b to execute a program stored in the storage unit 1a, for example.

The storage unit 1a stores first information that is used to determine whether or not any of a plurality of call destinations that are software is to be selected by a user for the contents of a call from a call source that is software. For example, the first information includes information that is used to determine whether or not any of software Y and Z is to be selected by the user for the contents of a call A from software X. For example, the contents of the call A indicate a predetermined function (for example, "input support" function). The software Y and Z is software that has the predetermined function. If the first information explicitly specifies call destination software for the predetermined function (for example, "input support" function), it may be determined that the software that is the call destination is not selected by the user. On the other hand, if the first information does not explicitly specify the call destination software for the predetermined function (for example, "input support" function), it may be determined that any of a plurality of call destinations that are software and associated with the predetermined function is to be selected by the user.

The storage unit 1a stores second information that indicates correspondence relationships between the contents of one or more calls from the call source that is the software and the call destinations that are the software. For example, the second information includes information indicating correspondence relationships between the contents of the call A from the software X and the software Y.

The computing unit 1b receives a call from a call source that is software. If the first information that is stored in the storage unit 1a indicates that any of a plurality of call destinations that are software is to be selected by the user, the computing unit 1b specifies, on the basis of the second information stored in the storage unit 1a, a call destination that is software and corresponds to the contents of the call, instead of causing the user to select any of the plurality of call destinations that are the software.

If "the first information indicates that any of the plurality of call destinations that are software is to be selected by the user", the first information may not explicitly specify a call destination for the call A from the call source software X. Alternatively, the first information may not include an entry related to the call A from the call source software X. Whether or not "the first information indicates that any of the plurality of call destinations that are the software is to be selected by the user" is determined on the basis of an environment for the execution of software in the information processing device 1 and the like.

For example, the computing unit 1b receives the call A placed by the software X. If the first information indicates that any of the software Y and Z is to be selected by the user for the call A, the computing unit 1b specifies the software Y corresponding to the contents of the call A on the basis of the second information instead of causing the user to select any of the software Y and Z.

The computing unit 1b executes the specified call destination software. For example, the computing unit 1b executes the specified software Y.

In the information processing device 1, the computing unit 1b receives a call from call source software. If the first information indicates any of a plurality of call destinations that are software is to be selected by the user, the computing unit 1b specifies, on the basis of the second information, a call destination that is software and corresponds to the contents of the call, instead of causing the user to select any of the plurality of call destinations that are the software. The specified call destination software is executed by the computing unit 1b.

Thus, the security is improved. For example, even if the software Z executes a malicious process, an opportunity for selection of the software Z by the user is suppressed and the information processing device 1 executes control so as to execute the software Y. The execution of the software Z is therefore suppressed. Thus, selection of malicious software by the user is inhibited, while a call specifies a certain function, for example. As a result, the security may be improved, while call source software may easily call other software.

The computing unit 1b may generate the second information. In this case, the computing unit 1b may acquire, from another device, third information that has, registered therein, information that indicates call destination software permitted to be used for each of the contents of calls from a group of software to which call source software belongs. Alternatively, the computing unit 1b may permit the user to enter the third information. The computing unit 1b may generate, on the basis of the third information, second information corresponding to the contents of a call placed by the call source software. If third information may be provided to the computing unit 1b for each of groups of software, ex-post registration of a security policy for a function (accounting function or the like) of business software may be easily executed.

Second Embodiment

Figure 2:
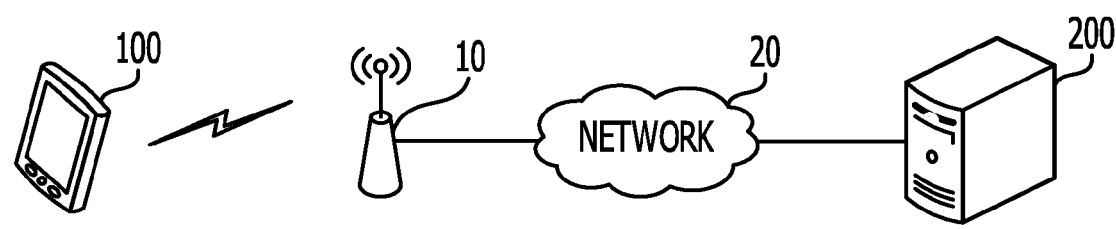
FIG. 2 is a diagram illustrating an information processing system according to the second embodiment.

FIG. 2 is a diagram illustrating an information processing system according to the second embodiment. The information processing system according to the second embodiment includes a mobile terminal device 100 and a server 200. The mobile terminal device 100 and the server 200 communicate with each other through an access point 10 and a network 20. The access point 10 is a wireless base station connected to the network 20. The access point 10 may be a wireless router connected to the network 20. The network 20 is a wide area network (WAN) such as the Internet. The network 20 may be a local area network (LAN).

The mobile terminal device 100 is an information processing device that is used by a user. The mobile terminal device 100 executes various types of application software (hereinafter referred to as an application in some cases) distributed by the server 200. The mobile terminal device 100 downloads a program describing a function of an application from the server 200 and stores the program, for example. The function of the application is executed on the mobile terminal device 100 when the mobile terminal device 100 executes the program.

The server 200 is a server computer that distributes programs of applications. The server 200 stores programs of applications of various types. The server 200 provides, to the mobile terminal device 100, a program of an application requested by the mobile terminal device 100.

The mobile terminal device 100 may use a method that supports coordination between applications. This method is referred to as an intent in some cases. The intent function is provided by an operating system (OS) executed by the mobile terminal device 100.

For example, when a certain application receives a character entry from the user, the intent function calls and executes an application for supporting character entries. For example, in order to view an image acquired by a certain application, the intent function calls and executes an application for viewing images. For example, in order to transmit an email to a destination acquired by a certain application, the intent function calls and executes a mailer. In addition, the intent function may specify data to be transmitted and received between applications.

The intent includes two types of intents that are each used depending on a method for specifying an application that coordinates with another application. The intents of the two types are an "explicit intent" and an "implicit intent". The "explicit intent" is a method in which information that explicitly specifies a call destination application (target) is included in a call source application. The "explicit intent" is a method for causing applications to tightly coordinate with each other.

The "implicit intent" is a method in which a call source application includes information that indicates a function to be called, instead of explicitly specifying a call destination application. The mobile terminal device 100 searches an application having the function (to be called) from among executable applications and executes the searched application. If a plurality of applications have the function to be called, the mobile terminal device 100 represents the plurality of applications as candidates for a call destination to the user and prompt the user to select any of the applications in order to execute the selected application. It may be said that the "implicit intent" is a method for causing applications to loosely coordinate with each other, compared with the "explicit intent".

When the "implicit intent" is used, a developer may not be explicitly aware of an application to be coordinated during development of an application. In the following description, a call that is placed by a call source application is referred to as an "intent" in some cases.

Figure 3:
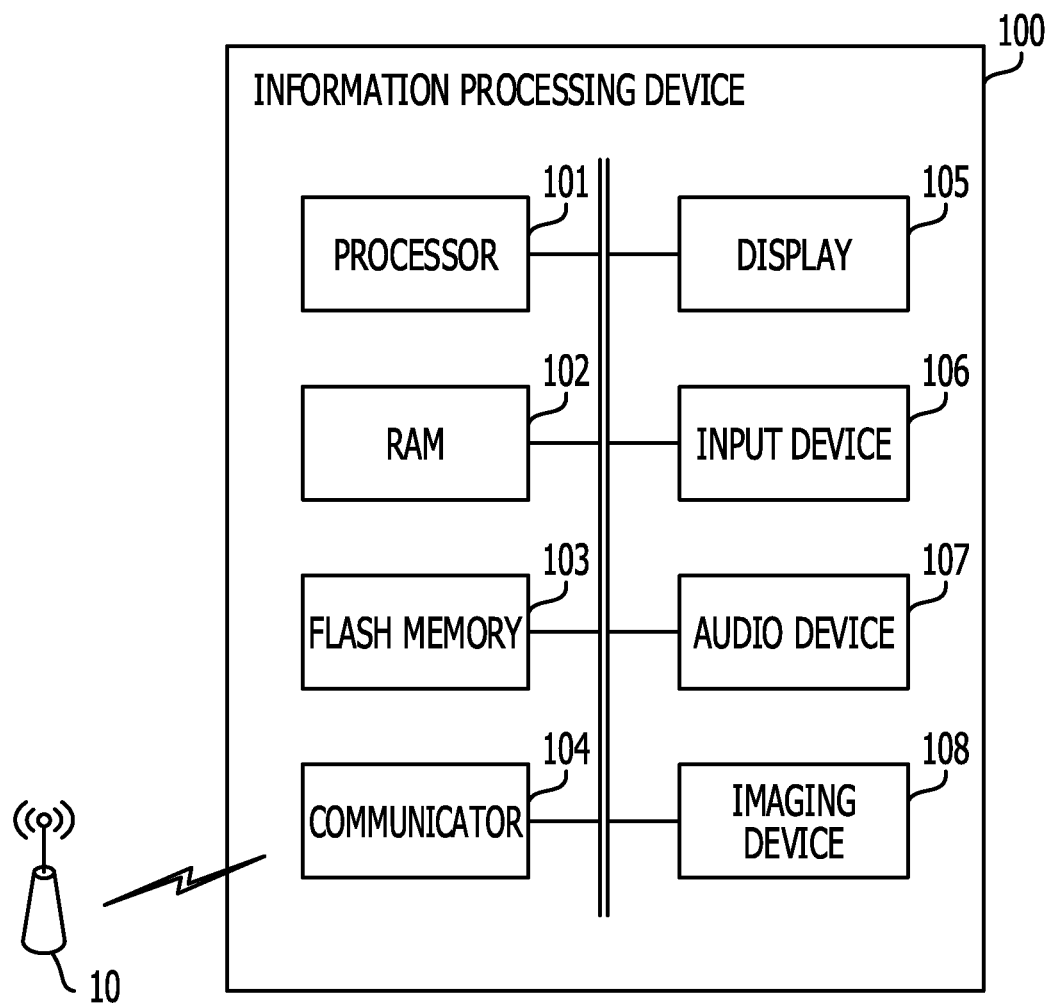
FIG. 3 is a diagram illustrating an example of hardware of a mobile terminal device according to the second embodiment.

FIG. 3 is a diagram illustrating an example of hardware of the mobile terminal device 100 according to the second embodiment. The mobile terminal device 100 includes a processor 101, a RAM 102, a flash memory 103, a communicator 104, a display 105, an input device 106, an audio device 107, and an imaging device 108. The units 101 to 108 are connected to a bus of the mobile terminal device 100.

The processor 101 controls information processing of the mobile terminal device 100. The processor 101 may be a multiprocessor. The processor 101 is, for example, a CPU, a micro processing unit (MPU), a digital signal processor (DSP), an application specific integrated circuit (ASIC), a field programmable gate array (FPGA), a programmable logic device (PLD), or the like. The processor 101 may be formed by combining two or more of the CPU, MPU, DSP, ASIC, FPGA, and PLD.

The RAM 102 is a main storage device of the mobile terminal device 100. The RAM 102 temporarily stores at least a part of a program of the OS to be executed by the processor 101 and a program of an application. The RAM 102 stores various types of data to be used for a process to be executed by the processor 101.

The flash memory 103 is an auxiliary storage device of the mobile terminal device 100. The flash memory 103 stores the program of the OS, a program of an application, and various types of data. The flash memory 103 may be a card memory that is removable from the mobile terminal device 100. A nonvolatile storage medium of another type may be used instead of or with the flash memory 103.

The communicator 104 is an interface that communicates with the server 200 through the access point 10. The communicator 104 may be a wireless interface or a wired interface. If the communicator 104 is the wired interface, the communicator 104 is connected to the access point 10 through a cable.

The display 105 outputs images of various types in accordance with control of the processor 101. As the display 105, a liquid crystal display or an electro luminescence (EL) display may be used, for example.

The input device 106 outputs an input signal based on an operation by the user to the processor 101. As the input device 106, a pointing device such as a touch panel or a keyboard may be used, for example.

The audio device 107 is composed of a microphone and a speaker. The microphone converts the physical vibration of a sound into an electric signal so as to receive audio input and outputs an audio signal to the processor 101. For example, when the user uses the mobile terminal device 100 to place a call, the voice of the user is input to the microphone. The speaker converts an audio signal into a physical vibration and reproduces a sound in accordance with control of the processor 101. For example, when the user uses the mobile terminal device 100 to place a call, the speaker outputs the voice of a person whom the user places the call to.

The imaging device 108 acquires a still image and a video image in accordance with control of the processor 101. As the imaging device 108, an image sensor such as a charge coupled device (CCD) or a complementary metal oxide semiconductor (CMOS) image sensor may be used, for example.

The server 200 may be achieved by the same hardware as the mobile terminal device 100. The server 200 may include a hard disk drive (HDD) or the like as an auxiliary storage device instead of the flash memory. The server 200 may not include the display, the input device, the audio device, and the imaging device, while the server may be provided with them internally or externally.

Figure 4:
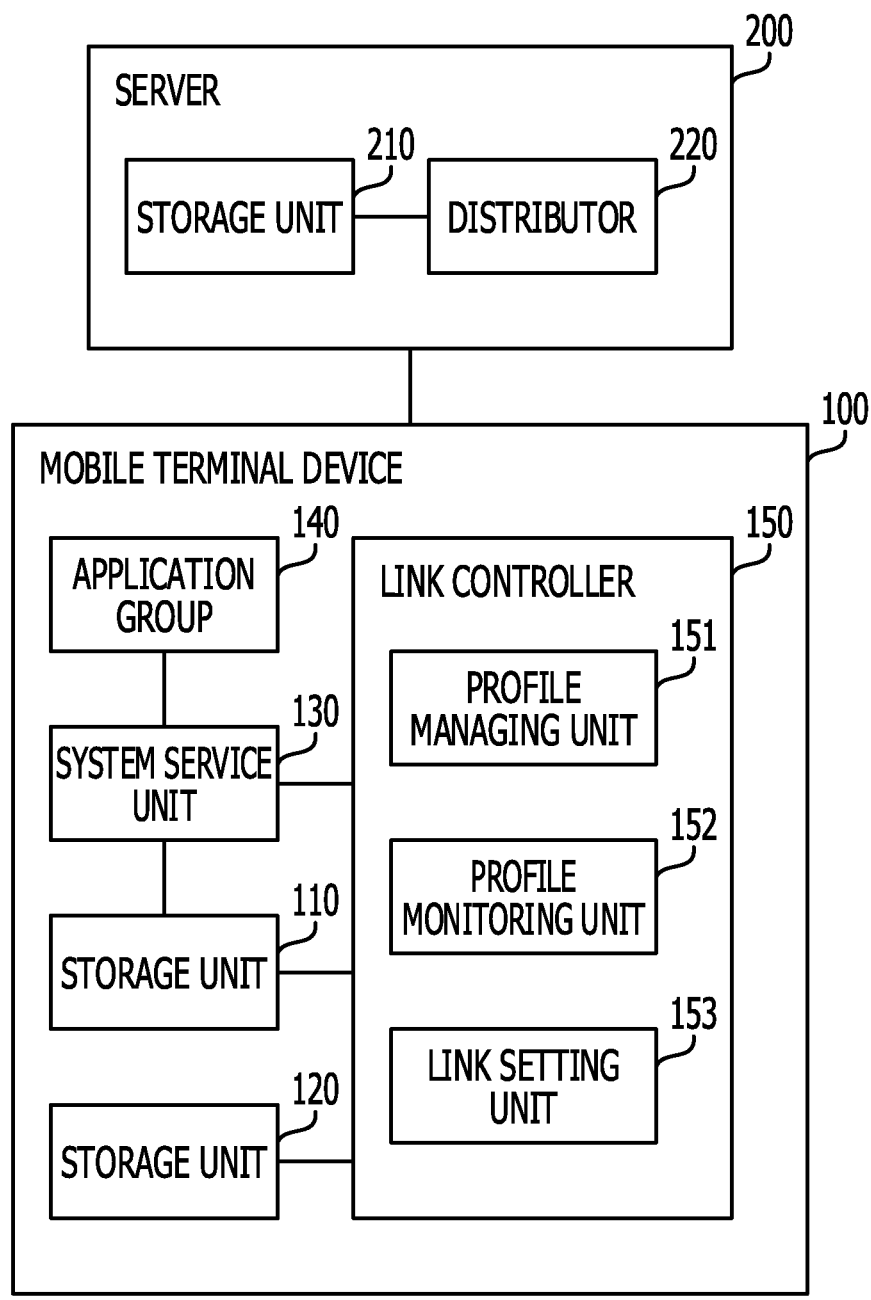
FIG. 4 is a diagram illustrating an example of software according to the second embodiment.

FIG. 4 is a diagram illustrating an example of software according to the second embodiment. A part or all of units illustrated in FIG. 4 may be modules of programs to be executed by the processors that are included in the mobile terminal device 100 and the server 200. A part or all of the units illustrated in FIG. 4 may be electronic circuits that are included in the mobile terminal device 100 and the server 200 and are FPGAs, ASICs, or the like.

The mobile terminal device 100 includes storage units 110 and 120, a system service unit 130, an application group 140, and a link controller 150.

The storage unit 110 stores data that is used for a process to be executed by the system service unit 130. The data stored in the storage unit 110 includes (1) a terminal management table in which version management information that indicates the version of the OS of the mobile terminal device 100 is registered, (2) a package management table in which packet management information that indicates revision numbers of applications installed in the mobile terminal device 100 are registered, (3) a category management table in which category management information on categories to which the applications belong are registered, and (4) intent selection data in which intent selection information that is used to control coordination between applications is registered. The intent selection data corresponds to the first information described in the first embodiment. In the following description, a single record within the data is referred to as information in some cases. For example, the category management information indicates a single record within the category management table in some cases. For example, the intent selection information indicates a single record within the intent selection data in some cases.

The storage unit 120 stores data that is used for a process to be executed by the link controller 150. The data stored in the storage unit 120 includes (1) a profile table in which profile information that is used to manage applications for each of application groups that are referred to as profiles is registered, (2) a security measures table in which security measures information that indicates applications that may be called for each of the profiles is registered, and (3) a link management table in which link management information that indicates applications that may be called for each of applications is registered. The link management table corresponds to the second information described in the first embodiment.

For example, the storage units 110 and 120 may be implemented using storage regions of the RAM 102 and flash memory 103. The storage units 110 and 120 are separated from each other. Even if the storage units 110 and 120 are provided as a single storage unit, information that is stored in the single storage unit is the same.

The system service unit 130 controls the execution of applications and the termination of the execution of the applications. The system service unit 130 provides the intent function on the basis of the intent selection data. The system service unit 130 supports coordination between applications by the "explicit intent" method and the "implicit intent" method.

The application group 140 is a group of applications that are currently executed in the mobile terminal device 100.

When a certain application calls another application, the link controller 150 intervenes in a process executed by the system service unit 130 on the basis of the type of the intent. The link controller 150 includes a profile managing unit 151, a profile monitoring unit 152, and a link setting unit 153.

The profile managing unit 151 acquires the profile information distributed by the server 200 and registers the profile information in the profile table. The profile managing unit 151 acquires the security measures information distributed by the server 200 and registers the security measures information in the security measures table. The profile managing unit 151 generates link management information on the basis of information stored in the storage units 110 and 120 and registers the generated link management information in the link management table upon the installation of an application in the mobile terminal device 100.

The profile monitoring unit 152 monitors whether or not link management information that corresponds to a call source application exists in the link management table when another application is called by an "implicit intent".

If the profile monitoring unit 152 determines that the corresponding link management information exists, the link setting unit 153 determines, on the basis of the link management table, whether or not an application that may be called by the call source application exists. If the application that may be called by the call source application exists, the link setting unit 153 registers a combination of the call source application and the call destination application in the intent selection data stored in the storage unit 110.

The server 200 includes a storage unit 210 and a distributor 220.

The storage unit 210 stores programs of applications and profile information for each of the applications. For example, the profile information and the security measures information are created by an administrator who manages the delivery of the applications or a creator of the applications and are stored in the storage unit 210. The storage unit 210 may be implemented using a storage region of the RAM, HDD, or the like in the server 200.

When receiving a request to download a program of an application from the mobile terminal device 100, the distributor 220 acquires the program from the storage unit 210 and provides the program to the mobile terminal device 100. When receiving a request to acquire profile information of an application from the mobile terminal device 100, the distributor 220 acquires the profile information and corresponding security measures information from the storage unit 210 and provides the acquired profile information and the acquired security measures information to the mobile terminal device 100.

Figure 5:
FIG. 5 is a diagram illustrating an example of a terminal management table according to the second embodiment.

FIG. 5 is a diagram illustrating an example of the terminal management table according to the second embodiment. A terminal management table 111 is stored in the storage unit 110. The terminal management table 111 includes items for a terminal model name, a platform revision number, a kernel revision number, and a build number.

In the terminal model name item, information that indicates a model name of the mobile terminal device 100 is registered. In the platform revision number item, a revision number of the platform OS of the mobile terminal device 100 is registered. In the kernel revision number item, a revision number of the kernel of the OS is registered. In the build number item, a build number of a software development kit for the mobile terminal device 100 is registered.

For example, information that indicates a terminal model name "F-01X", a platform revision number "2.2.0", a kernel revision number "2.6.30", and a build number "SDK-2.2.2-GR134" is registered in the terminal management table 111.

FIG. 6 is a diagram illustrating an example of the package management table according to the second embodiment. A package management table 112 is stored in the storage unit 110. The package management table 112 includes items for package names, program information, resource information, manifest information, and signature information.

In the package name item, a package name of an application is registered. The package name is represented by a uniform resource identifier (URI), for example. In the program information item, information that indicates a directory at which a program of the application is stored and the name of an executable file in which the program of the application is stored is registered. In the resource information item, information that indicates a directory at which various files to be used for a process of the application and the names of the files is registered. In the manifest information item, various types of information (information indicating a category of a call destination application and a kernel revision number ensuring operations) that is included in the application is registered. In the signature information item, information (signature information) that indicates a developer of the application is registered. The signature information is an example of information that indicates a source of providing the application.

For example, the following information is stored in the package management table 112: information that indicates a package name "jp.abc.gyoumu.kaikei.A", program information "./A/, Aapp.jar, comm.jar", resource information "./A/, gyoumu.png, entry.png", manifest information "INPUT- METHOD: permission of the use of a software keyboard and an intent, PHONE: permission of the use of a phone and an intent, and a kernel revision number ensuring operations: 2.0.0 or greater", and signature information "developer A".

This information indicates that executable files of an application indicated by the package name "jp.abc.gyoumu.kaikei.A" and the like are stored at the directory "./A/". In addition, the information indicates that the executable files are "Aapp.jar" and "comm.jar" and files "gyoumu.png" and "entry.png" that are used for a graphical user interface (GUI) of the application and the like exist. Furthermore, the information indicates that other applications specified by the categories "INPUTMETHOD" and "PHONE" are called on the basis of a process of the interested application. The information indicates that a kernel revision number that ensures operations for the interested application is "2.0.0" or greater and a developer (source of providing the application) is a "developer A".

In the manifest information, information that is referred to as an intent filter may be registered. The intent filter may be set on a target side and include information indicating categories to which applications belong. The intent filter may include information indicating a permitted operation (action). The OS of the mobile terminal device 100 may reference the intent filter set in the manifest information of the application and determine an action and category of an intent that may be received by the application.

FIG. 7 is a diagram illustrating an example of the category management table according to the second embodiment. A category management table 113 is stored in the storage unit 110. The category management table 113 includes items for categories and URIs of call destination applications.

In the category item, information that indicates the name of a category is registered. In the call destination application URI item, a URI of an application that is a candidate for a call destination and belongs to the category is registered.

For example, information that indicates a category "INPUTMETHOD" and a URI "com.pkg.openwnn" of a call destination application is registered in the category management table 113. This information indicates that when a call that specifies the category "INPUTMETHOD" is provided by the "implicit intent" method, a candidate for a call destination is an application indicated by the URI "com.pkg.openwnn".

The category management table 113 indicates that other applications ("com.pkg.input", "osxx.pkg.keyboard", and the like) belong to the category "INPUTMETHOD". Thus, the other applications are candidates for the call destination when the call that specifies the category "INPUTMETHOD" is placed.

Note that categories may be associated with actions requested for applications to be coordinated. For example, the actions may include the following actions: (1) an action "ACTION_EDIT" of starting a call destination application while data is editable; (2) an action "ACTION_MAIN" of starting a call destination application from a main state (in which there is no input data and no return of output) of the application; and (3) an action "ACTION_CALL" of starting a call. The actions may include various actions other than the actions exemplified in (1) to (3).

FIG. 8 is a diagram illustrating an example of the intent selection data according to the second embodiment. Intent selection data 114 is stored in the storage unit 110. The intent selection data 114 may be updated by the system service unit 130 and the link setting unit 153. In FIG. 8, the intent selection data 114 is stored in a table format for convenience. The intent selection data 114, however, may not be stored in the table format. The intent selection data 114 includes items for URIs of call source applications, actions, categories, and URIs of call destination applications.

In the call source application URI item, a URI of a call source application is registered. In the action item, an action for a call destination application is registered. In the category item, a category that is included in the contents of a call is registered. In the call destination application URI item, a URI of the call destination application is registered.

For example, information that indicates a URI "jp.xxx.app.X" of a call source application, the action "ACTION_EDIT", the category "INPUTMETHOD", and the URI "com.pkg.openwnn" of the call destination application is registered in intent selection information 114-1. This information indicates that when the application that is indicated by the URI "jp.xxx.app.X" places a call that specifies the action "ACTION_EDIT" and the category "INPUTMETHOD", the application that is indicated by the URI "com.pkg.openwnn" is executed. This is an "explicit intent".

For example, information that indicates a URI "jp.yyy.app.Y" of a call source application, the action "ACTION_EDIT", the category "INPUTMETHOD", and a URI "-" of a call destination application is registered in intent selection information 114-2. The hyphen "-" within the call destination application URI item indicates that a call destination application is not explicitly set. Specifically, when the application that is indicated by the URI "jp.yyy.app.Y" places a call that specifies the action "ACTION_EDIT" and the category "INPUTMETHOD", any of call destination applications that belong to the action "ACTION_EDIT" and the category "INPUTMETHOD" is selected by the user. This is an "implicit intent".

An action is specified in intent selection information in a finite form. Hereinafter, a description of specifying of an action in intent selection information is omitted in order to avoid duplication and complexity of a description.

FIG. 9 is a diagram illustrating an example of the profile table according to the second embodiment. A profile table 121 is stored in the storage unit 120. The profile table 121 includes items for profile identifiers (IDs), profile characteristic names, and prefixes.

In the profile ID item, information that identifies a profile is registered. In the profile characteristic name item, information that indicates a characteristic of the profile is registered. In the prefix item, a prefix of a URI that identifies an application belonging to the profile is registered.

For example, information that indicates a profile ID "PROF-A", a profile characteristic name "current environment", and a prefix "com.osxx.*" is registered in the profile table 121. This information indicates that a characteristic name of a profile identified by the profile ID "PROF-A" is a "current environment" and an application group of which a URI prefix is "com.osxx.*" corresponds to the profile. The asterisk "*" is a wild card that indicates a character or a character string having an arbitrary length.

The meaning of information set in the profile characteristic name item is as follows. The "current environment" indicates an application group provided by the current version OS executed on the mobile terminal device 100. A "previous environment" indicates an application group provided by the previous version OS executed on the mobile terminal device 100, while the previous version is previous to the current version. An "individual" indicates an application group installed by the individual. A "company" indicates an application group installed for business by the company.

A plurality of profiles may belong to a single profile characteristic name. For example, each of profile characteristic names of profile IDs "PROF-2" and "PROF-3" is a "company".

FIG. 10 is a diagram illustrating an example of the security measures table according to the second embodiment. A security measures table 122 is stored in the storage unit 120. The security measures table 122 includes items for profile characteristic names, signature information and permitted applications.

In the profile characteristic name item, a profile characteristic name is registered. In the signature information item, information that indicates a developer (providing source) is registered. In the permitted application item, a URI of an application permitted as a call destination is registered for each of actions that may be included in an "implicit intent" and categories that may be included in the "implicit intent".

For example, the following information is registered in the security measures table 122: information that indicates a profile characteristic name "default", signature information "developer Y", applications indicated by URIs "osxx.pkg.keyboard" and "osxx.pkg.input" and permitted for the action "ACTION_EDIT" and the category "INPUTMETHOD", an application indicated by a URI "osxx.pkg.phone" and permitted for the action "ACTION_MAIN" and the category "PHONE", and an application indicated by a URI "osxx.pkg.camera" and permitted for the action "ACTION_MAIN" and a category "CAMERA".

A record of the profile characteristic name "default" does not belong to any profile or is a filter rule that is commonly applied to profiles for which security measures information is not registered in the security measures table 122. The record indicates that only the applications of which a developer (providing source) is "developer Y" are permitted as candidates for a call destination for the profile. In addition, the record indicates that the applications indicated by the URIs "osxx.pkg.keyboard" and "osxx.pkg.input" are permitted as call destination applications for a call that specifies the action "ACTION_EDIT" and the category "INPUTMETHOD". The record indicates that only the application indicated by the URI "osxx.pkg.phone" is permitted as a call destination application for a call that specifies the action "ACTION_MAIN" and the category "PHONE". The record indicates that only the application indicated by the URI "osxx.pkg.camera" is permitted as a call destination application for a call that specifies the action "ACTION_MAIN" and the category "CAMERA".

For example, the following information is registered in the security measures table 122: information that indicates a profile characteristic name "company", signature information "developer X", the application indicated by the URI "com.pkg.openwnn" and permitted for the call specifying the action "ACTION_EDIT" and the category "INPUTMETHOD", the application indicated by the URI "com.pkg.phone" and permitted for the call specifying the action "ACTION_MAIN" and the category "PHONE", and the application indicated by the URI "com.pkg.camera" and permitted for the call specifying the action "ACTION_MAIN" and the category "CAMERA".

The information indicates that only the applications of which a developer (providing source) is "developer X" are permitted as candidates for a call destination for the profile of the profile characteristic name "company". In addition, the information indicates that only the application indicated by the URI "com.pkg.openwnn" is permitted as a call destination application for the call that specifies the action "ACTION_EDIT" and the category "INPUTMETHOD". The information indicates that only the application indicated by the URI "com.pkg.phone" is permitted as a call destination application for the call that specifies the action "ACTION_MAIN" and the category "PHONE". The information indicates that only the application indicated by the URI "com.pkg.camera" is permitted as a call destination application for the call that specifies the action "ACTION_MAIN" and the category "CAMERA".

The following description assumes that profile information includes security measures information registered in the security measures table 122 unless otherwise specified. For example, it is assumed that profile information of a profile ID "PROF-2" indicates a certain record including the profile ID "PROF-2" and included in the profile table 121 and a record of the profile characteristic name "company" corresponding to the certain record.

FIG. 11 is a diagram illustrating an example of the link management table according to the second embodiment. A link management table 123 is stored in the storage unit 120. The link management table 123 includes items for URIs of call source applications, actions, categories, and URIs of call destination applications.

In the call source application URI item, a URI of a call source application is registered. In the action item, an action for a call destination application is registered. In the category item, a category included in the contents of a call is registered. In the call destination application item, a URI of the call destination application is registered.

For example, the following information is registered in the link management table 123: information that indicates the URI "jp.abc.gyoumu.kaikei.A" of the call source application, the action "ACTION_EDIT", the category "INPUTMETHOD", and the URI "com.pkg.openwnn" of the call destination application. The information indicates that the intent selection data 114 is set so that when the application that is indicated by the URI "jp.abc.gyoumu.kaikei.A" places a call that specifies the action "ACTION_EDIT" and the category "INPUTMETHOD", the application that is indicated by the URI "com.pkg.openwnn" is executed.

Figure 12:
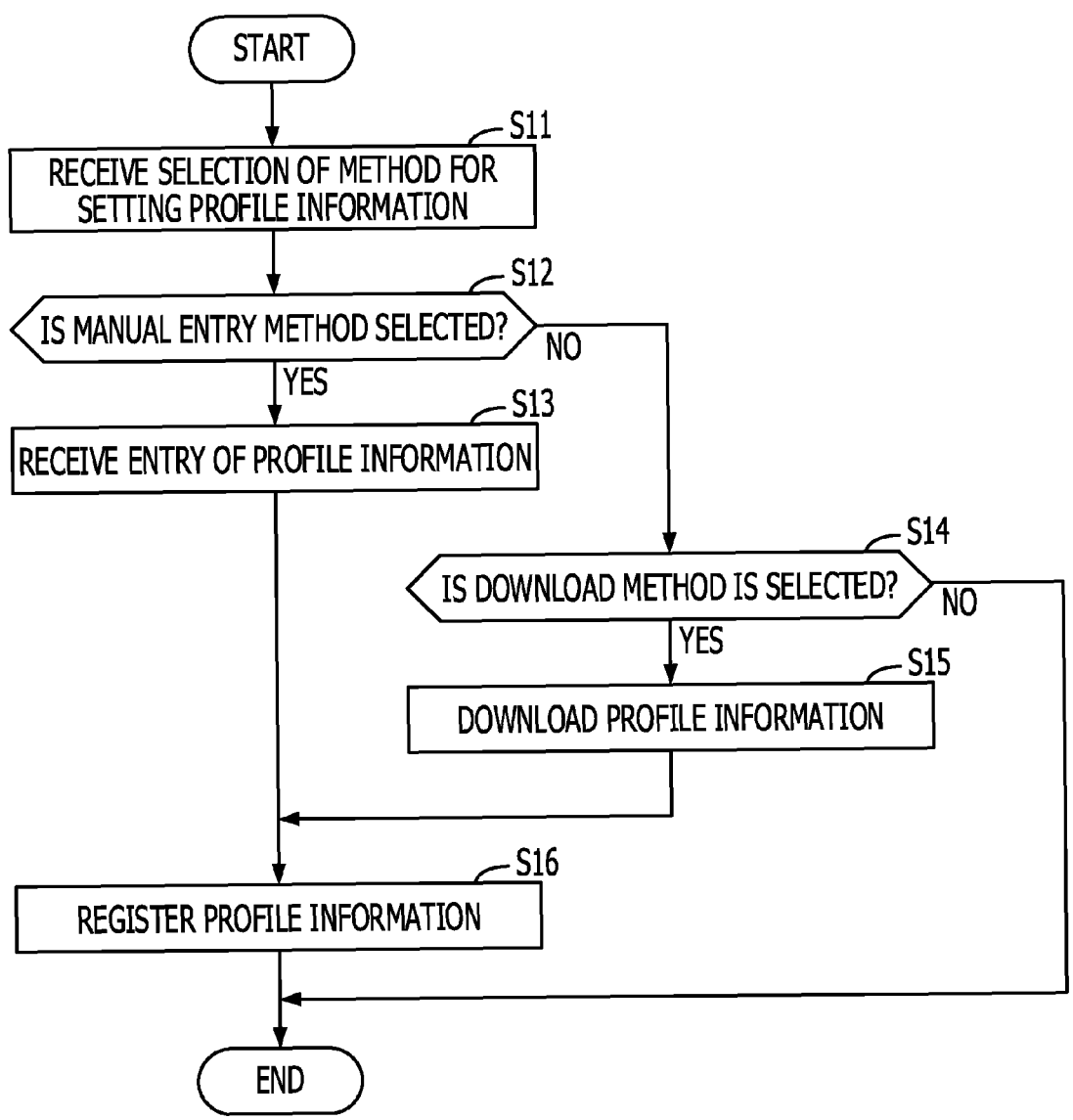
FIG. 12 is a flowchart of an example of profile acquisition according to the second embodiment.

FIG. 12 is a flowchart of an example of profile acquisition according to the second embodiment. A process illustrated in FIG. 12 is described using step numbers.

In step S11, the profile managing unit 151 receives selection of a method for setting profile information specifying an application. The user may use methods of two types to set profile information in the mobile terminal device 100 for each of applications. One of the methods is a method for manually entering the profile information, while the other method is a method for downloading the profile information from the server 200. For example, the profile managing unit 151 may cause the display 105 to display a GUI that prompts the user to select any of the two methods in order to enter the profile information. In this case, the profile managing unit 151 may receive the selection by the user.

In step S12, the profile managing unit 151 determines whether or not the manual entry method is selected. If the manual entry method is selected, the profile managing unit 151 causes the process to proceed to step S13. If the manual entry method is not selected, the profile managing unit 151 causes the process to proceed to step S14.

In step S13, the profile managing unit 151 receives the entry of the profile information from the user using the input device 106. For example, the profile managing unit 151 may cause the display 105 to display a GUI for receiving an entry of information to be registered in the items of the profile table 121 stored in the storage unit 120 and may receive the entry of the profile information from the user. Then, the profile managing unit 151 causes the process to proceed to step S16.

In step S14, the profile managing unit 151 determines whether or not the download method is selected. If the download method is selected, the profile managing unit 151 causes the process to proceed to step S15. If the download method is not selected, the profile managing unit 151 terminates the process.

In step S15, the profile managing unit 151 downloads the profile information corresponding to the application specified in step S11 from the server 200.

In step S16, the profile managing unit 151 registers the acquired profile information in the profile table 121.

In this manner, the mobile terminal device 100 acquires the profile information and registers the acquired profile information in the profile table 121. For example, step S11 may start at a time (for example, the time when the mobile terminal device 100 receives an entry for the start from the user) specified by the user. Alternatively, the step S11 may start when an application is newly installed. Specifically, step S11 may start (1) before the download, or (2) upon the download, or (3) after the download. The profile managing unit 151 represents a GUI for prompting the user to select any of the times (1) to (3).

Next, a procedure for acquiring the new application is described.

Figure 13:
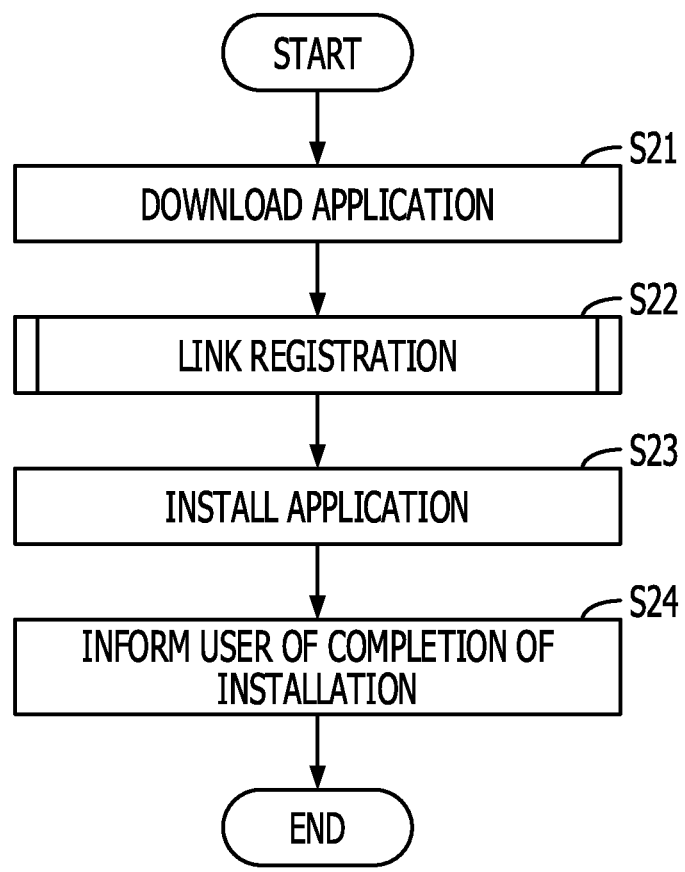
FIG. 13 is a flowchart of an example of application acquisition according to the second embodiment.

FIG. 13 is a flowchart of an example of the acquisition of the application according to the second embodiment. A process illustrated in FIG. 13 is described using step numbers.

In step S21, the system service unit 130 downloads a program of the new application from the server 200. The system service unit 130 acquires package management information from data of the downloaded application and registers the acquired package management information in the package management table 112 stored in the storage unit 110.

In step S22, the system service unit 130 transfers the process to the profile managing unit 151. The profile managing unit 151 generates link management information on the basis of the package management information of the interested application and registers the generated link management information in the link management table 123. The profile managing unit 151 transfers the process to the system service unit 130.

In step S23, the system service unit 130 installs the downloaded application.

In step S24, the system service unit 130 informs the user that the installation of the application has been completed and the application may be used.

Next, a procedure of step S22 is described in detail.

Figure 14:
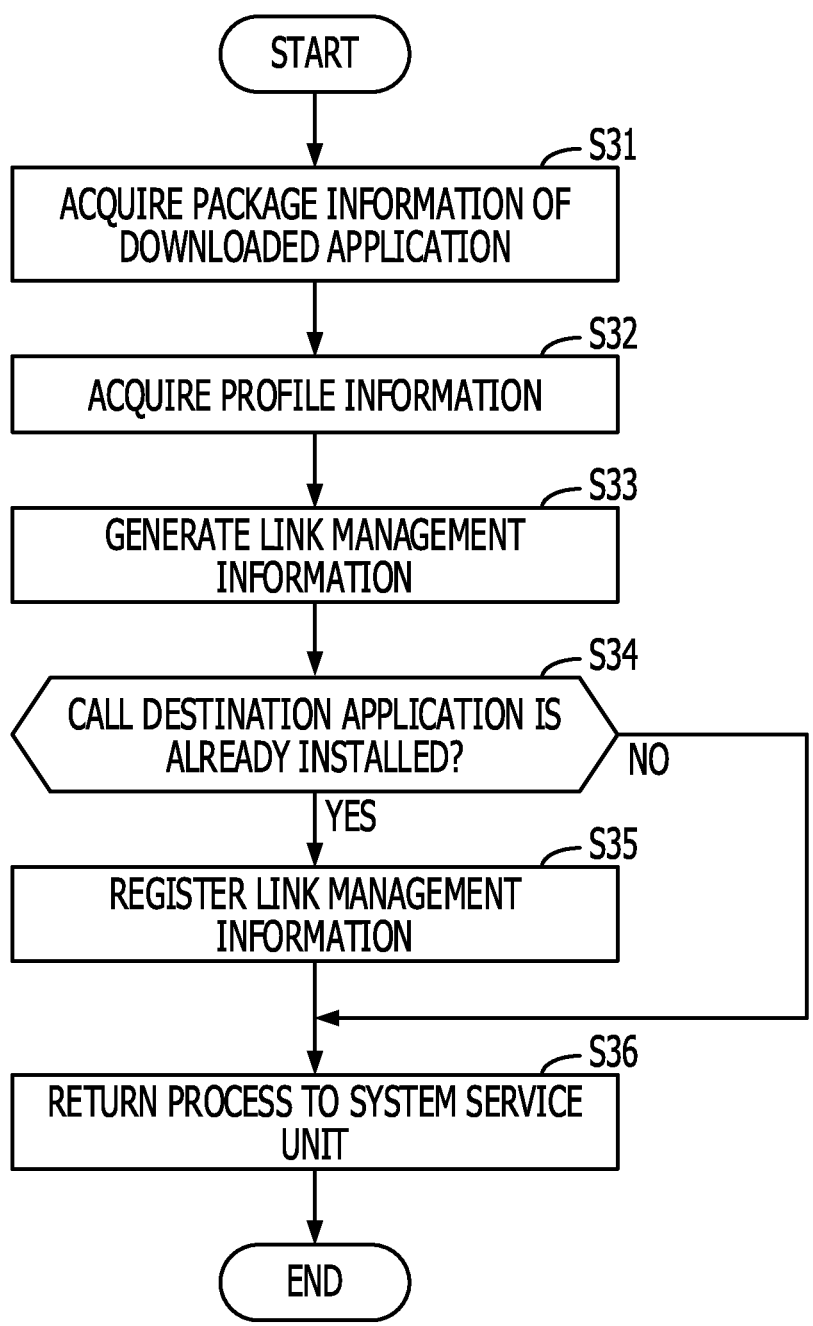
FIG. 14 is a flowchart of an example of link registration according to the second embodiment.

FIG. 14 is a flowchart of an example of link registration according to the second embodiment. A process illustrated in FIG. 14 is described using step numbers.

In step S31, the profile managing unit 151 references the package management table 112 stored in the storage unit 110 and acquires the package management information of the downloaded application.

In step S32, the profile managing unit 151 extracts a package name from the package management information. In this case, the profile managing unit 151 crosschecks manifest information included in the package management information with a platform revision number registered in the terminal management table 111 and the like and confirms that the package name matches a current operation environment of the mobile terminal device 100. The profile managing unit 151 references the profile table 121 and acquires profile information corresponding to a prefix of the package name.

In step S33, the profile managing unit 151 references the profile information on the application and generates link management information. Specifically, the profile managing unit 151 extracts a call ("implicit intent") that has been placed by another application and specifies a category included in the manifest information. Then, the profile managing unit 151 acquires an application permitted for the category from the security measures table 122. A record of the profile table 121 and a record of the security measures table 122 are associated with each other by a profile characteristic name. The profile managing unit 151 also crosschecks signature information. Specifically, the profile managing unit 151 confirms whether or not the signature information of the permitted application matches the signature information registered in the package management table 112. The matching is performed for the reason that if the signature information does not match, the package name registered in the package management table 112 may be falsified by a malicious application. The profile managing unit 151 generates link management information that indicates correspondence relationships among the downloaded application, the category extracted from the manifest information, and the application permitted by the security measures information. If the impersonation is detected, the profile managing unit 151 may not generate the link management information and may skip steps S34 and S35 and cause the process to proceed to step S36.

In step S34, the profile managing unit 151 determines whether or not a call destination application indicated in the link management information generated in step S33 is already installed in the mobile terminal device 100. If the call destination application is already installed, the profile managing unit 151 causes the process to proceed to step S35. If the call destination application is not installed, the profile managing unit 151 causes the process to proceed to step S36.

In step S35, the profile managing unit 151 registers the link management information generated in step S33 in the link management table 123.

In step S36, the profile managing unit 151 returns the process to the system service unit 130.

In this manner, the mobile terminal device 100 generates the link management information on the basis of the profile information at the time of downloading the program of the application and registers the link management information in the link management table 123. If the call destination application is not installed, a new entry is not added to the link management table 123.

Generation of link management information on an application that does not exist in the mobile terminal device 100 is inhibited by generating link management information at the time of downloading an application. For example, if the mobile terminal device 100 holds unwanted information, a storage region of the mobile terminal device 100 is wastefully used and it is not efficient.

Since package management information on an application is acquired upon downloading of the application, the package management information is not downloaded from the server 200 at a different time from the time when the application is downloaded. Thus, an extra load is not applied to the server 200, the network 20, and the like.

A specific example of the process of step S33 is described below. For example, in the case where the application indicated by the URI "jp.abc.gyoumu.kaikei.A" is downloaded, the process of step S33 is executed as follows. It is assumed that the two categories "INPUTMETHOD" and "PHONE" are registered as an "implicit intent" in the manifest information of the URI "jp.abc.gyoumu.kaikei.A".

In this case, the application belongs to the profile "PROF-3" according to the profile table 121. This is due to the fact that the application corresponds to a prefix "jp.abc.gyoumu.kaikei.*". Since the profile characteristic name is a "company", a record of the profile characteristic name "company" is referenced in the security measures table 122. In the record, the application indicated by the URI "com.pkg.openwnn" is permitted as a call destination application for the category "IPUTMETHOD" (action "ACTION_EDIT"). In addition, the application indicated by the URI "com.pkg.phone" is permitted as a call destination application for the category "PHONE" (action "ACTION_MAIN").

Thus, the profile managing unit 151 first generates link management information that indicates correspondence relationships among the call source application URI "jp.abc.gyoumu.kaikei.A", the action "ACTION_EDIT", the category "INPUTMETHOD", and the call destination application URI "com.pkg.openwnn". The profile managing unit 151 next generates link management information that indicates correspondence relationships among the call source application URI "jp.abc.gyoumu.kaikei.A", the action "ACTION_MAIN", the category "PHONE", and the call destination application URI "com.pkg.phone".

In step S33, even if a profile is registered in the profile table 121, a profile characteristic name corresponding to the profile may not exist in the security measures table 122. In addition, an entry that is related to a call source application may not exist in the profile table 121 and the security measures table 122. In such cases, link management information may be generated using a record of the profile characteristic name "default" registered in the security measures table 122.

A plurality of applications that are permitted as call destinations for a certain category may be registered in the security measures table 122. In this case, in step S33, the profile managing unit 151 may makes an inquiry to the user about which application the user select as a call destination. For example, a GUI for the selection may be prompted to the user, and the selection by the user may be received. Thus, a reliable application is registered in the security measures table 122. Even if the user selects an application in step S33, the security is ensured. If any of a plurality of applications is yet to be installed and call destinations may be narrowed down to one call destination, the user may not select a call destination application.

Next, a procedure for intent control to be executed upon the execution of an application is described.

Figure 15:
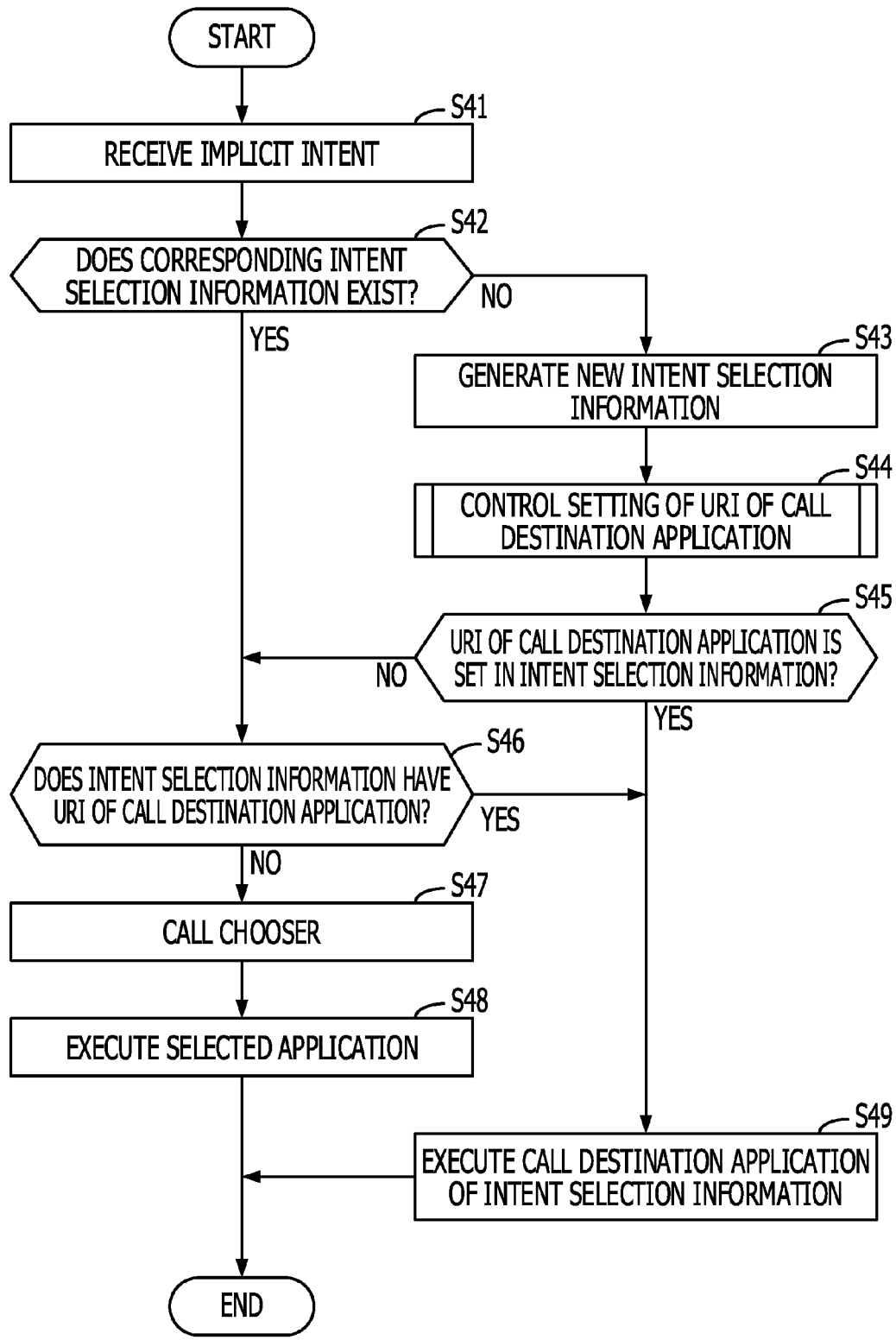
FIG. 15 is a flowchart of an example of intent control according to the second embodiment.

FIG. 15 is a flowchart of an example of the intent control according to the second embodiment. A process illustrated in FIG. 15 is described below using step numbers.

In step S41, the system service unit 130 receives an "implicit intent" from a certain application. The system service unit 130 acquires the URI of the call source application and information of an action and a category that are specified by the "implicit intent".

In step S42, the system service unit 130 references the intent selection data 114 stored in the storage unit 110 and determines whether or not a record that includes the URI of the call source application, the action and the category exists in the intent selection data 114. If the record exists, the system service unit 130 causes the process to proceed to step S46. If the record does not exist, the system service unit 130 causes the process to proceed to step S43.

In step S43, the system service unit 130 generates new intent selection information. The intent selection information is a single record included in the intent selection data 114. The new intent selection information has, set therein, the information acquired in step S41 and indicating the URI of the call source application, the action and the category. A URI of a call destination application is not set in the new intent selection information. The system service unit 130 calls the profile monitoring unit 152 and transfers the process to the profile monitoring unit 152.

In step S44, the profile monitoring unit 152 controls setting of a URI of a call destination application in the intent selection information acquired from the system service unit 130. As a result of the process of step S44, the URI of the call destination application is set in the intent selection information. The URI of the call destination application may not be set in the intent selection information depending on the content of the process. After completion of the process of step S44, the profile monitoring unit 152 transfers the process to the system service unit 130.

In step S45, the system service unit 130 determines whether or not the URI of the call destination application is set in the new intent selection information. If the URI of the call destination application is set, the system service unit 130 causes the process to proceed to step S49. If the URI of the call destination application is not set, the system service unit 130 causes the process to proceed to step S46. If the URI of the call destination application is not set, the system service unit 130 may discard the intent selection information generated in step S43.

In step S46, the system service unit 130 references the intent selection data 114 and determines whether or not the call destination application URI corresponding to the "implicit intent" received in step S41 is set. If the call destination application URI is set, the system service unit 130 causes the process to proceed to step S49. If call destination application URI is not set, the system service unit 130 causes the process to proceed to step S47.

In step S47, the system service unit 130 calls Chooser. Chooser is a function of representing a plurality of applications that are candidates for a call destination to the user and prompting the user to select any of the applications. For example, Chooser references the category management table 113 stored in the storage unit 110 and acquires URIs of applications that are call destination candidates corresponding to the specified category. Chooser may receive selection by the user and receive information specifying that "a selected application is called later". In this case, Chooser may set a URI of the selected call destination application in a record (intent selection information) corresponding to the intent selection data 114. If the number of candidates for the call destination is one in the category management table 113, the call destination candidate may not be represented to the user and the process may proceed to step S48.

In step S48, the system service unit 130 executes the call destination application selected by the user. If only a single application that is a call destination candidate exists in step S47, the system service unit 130 executes the single application.

In step S49, the system service unit 130 executes the corresponding call destination application set in the intent selection data 114.

If an "implicit intent" is provided, the mobile terminal device 100 causes the profile monitoring unit 152 to control setting of an URI of a call destination application in the intent selection data 114. Thus, a call destination application URI corresponding to the "implicit intent" may be registered in the intent selection data 114. Next, a procedure of step S44 is described.

Figure 16:
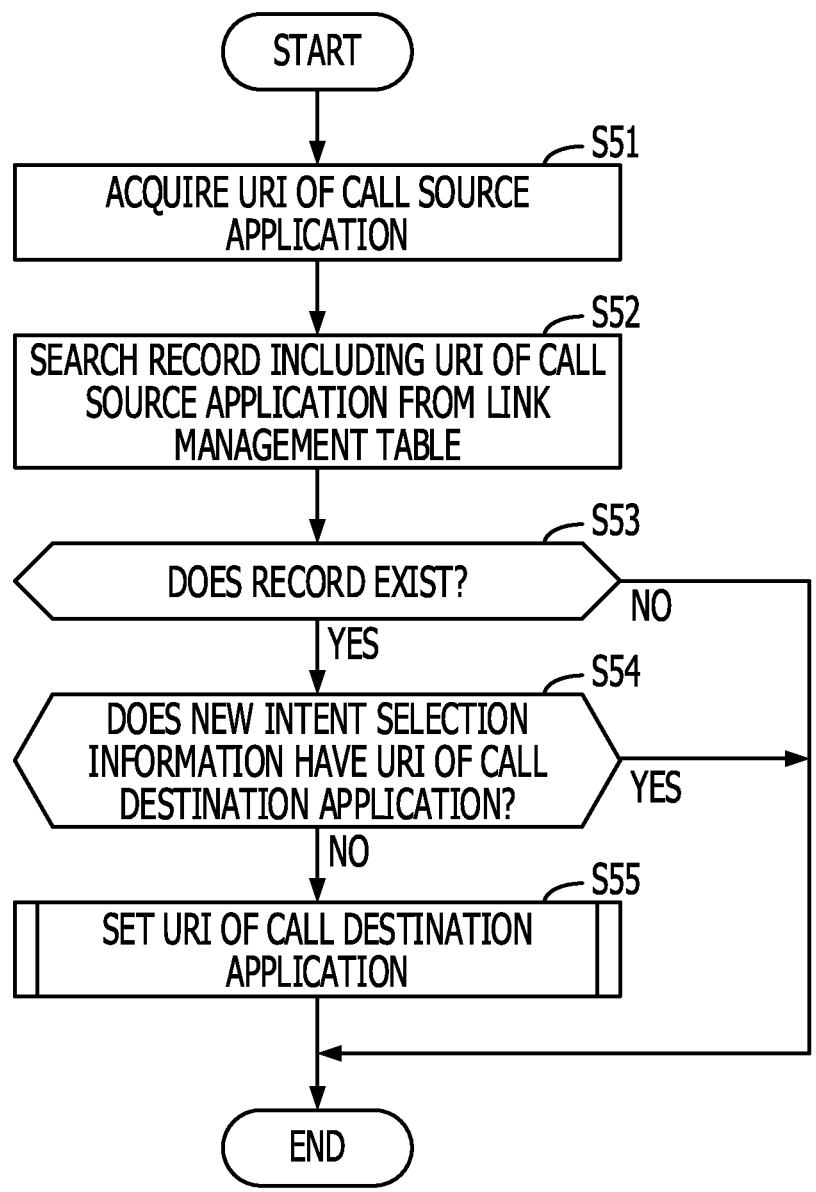
FIG. 16 is a flowchart of an example of control of setting of a call destination according to the second embodiment.

FIG. 16 is a flowchart of an example of control of setting of a call destination according to the second embodiment. A process illustrated in FIG. 16 is described using step numbers.

In step S51, the profile monitoring unit 152 acquires a URI of an application that is a call source (source of issuing an "implicit intent").

In step S52, the profile monitoring unit 152 references the link management table 123 stored in the storage unit 120 and searches a record that includes the acquired URI.

In step S53, the profile monitoring unit 152 determines whether or not the record exists. If the record exists, the profile monitoring unit 152 causes the process to proceed to step S54. If the record does not exist, the profile monitoring unit 152 terminates the process.

In step S54, the profile monitoring unit 152 determines whether or not the new intent selection information (generated in step S43 illustrated in FIG. 15) has, set therein, the URI of the call destination application. If the new intent selection information does not have the URI, the profile monitoring unit 152 causes the process to proceed to step S55. If the new intent selection information has the URI set therein, the profile monitoring unit 152 terminates the process.

In step S55, the profile monitoring unit 152 calls the link setting unit 153 and transfers the process to the link setting unit 153. The link setting unit 153 executes a process of setting the call destination application in the intent selection information. Next, a procedure of step S55 is described.

Figure 17:
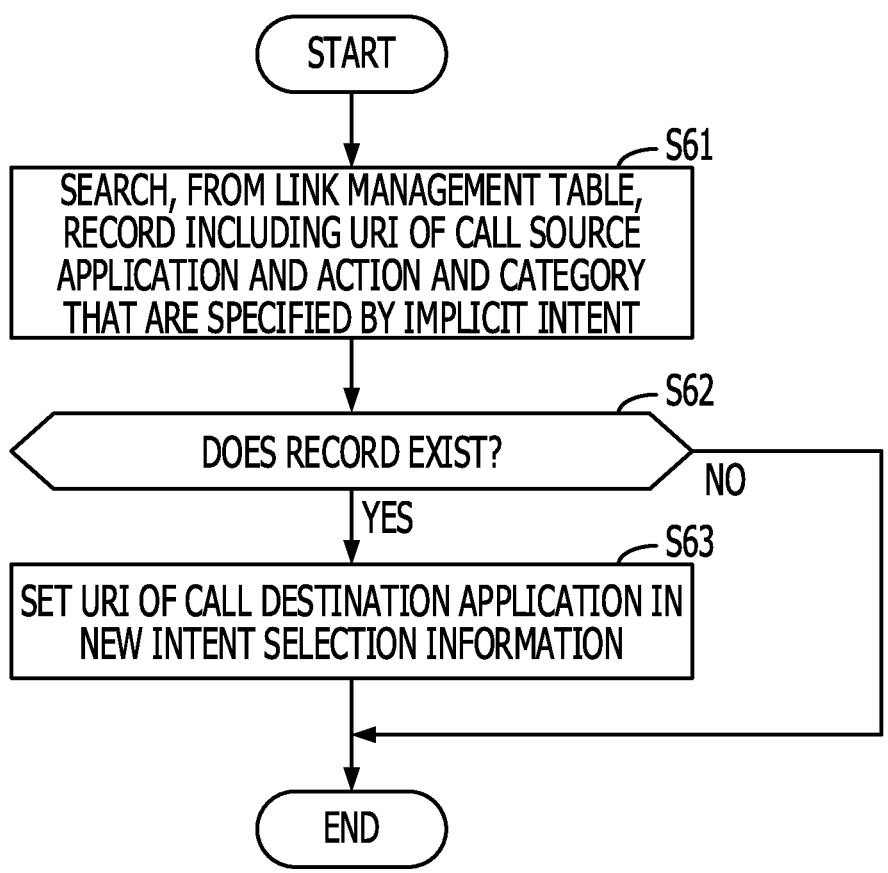
FIG. 17 is a flowchart of an example of setting of a call destination according to the second embodiment.

FIG. 17 is a flowchart of an example of setting of a call destination according to the second embodiment. A process illustrated in FIG. 17 is described using step numbers.

In step S61, the link setting unit 153 searches, from the link management table 123, a record that includes the URI of the call source application, an action specified by the "implicit intent", and a category specified by the "implicit intent".

In step S62, the link setting unit 153 determines whether or not the record exists. If the record exists, the link setting unit 153 causes the process to proceed to step S63. If the record does not exist, the link setting unit 153 terminates the process.

In step S63, the link setting unit 153 acquires a call destination application URI included in the record searched from the link management table 123. The link setting unit 153 sets the acquired URI in the new intent selection information (generated in step S43 illustrated in FIG. 15) generated by the system service unit 130.

In this manner, the mobile terminal device 100 causes the link controller 150 (profile monitoring unit 152 and link setting unit 153) to register a URI of a call destination application in intent selection information every time an "implicit intent" is provided. A URI to be set may be determined on the basis of the link management table 123. Even if the intent selection data 114 indicates, for the system service unit 130, that a plurality of call destination applications are selected by the user for an "implicit intent", the link controller 150 may specify a call destination application corresponding to the "implicit intent" on the basis of the link management table 123.

Figure 18:
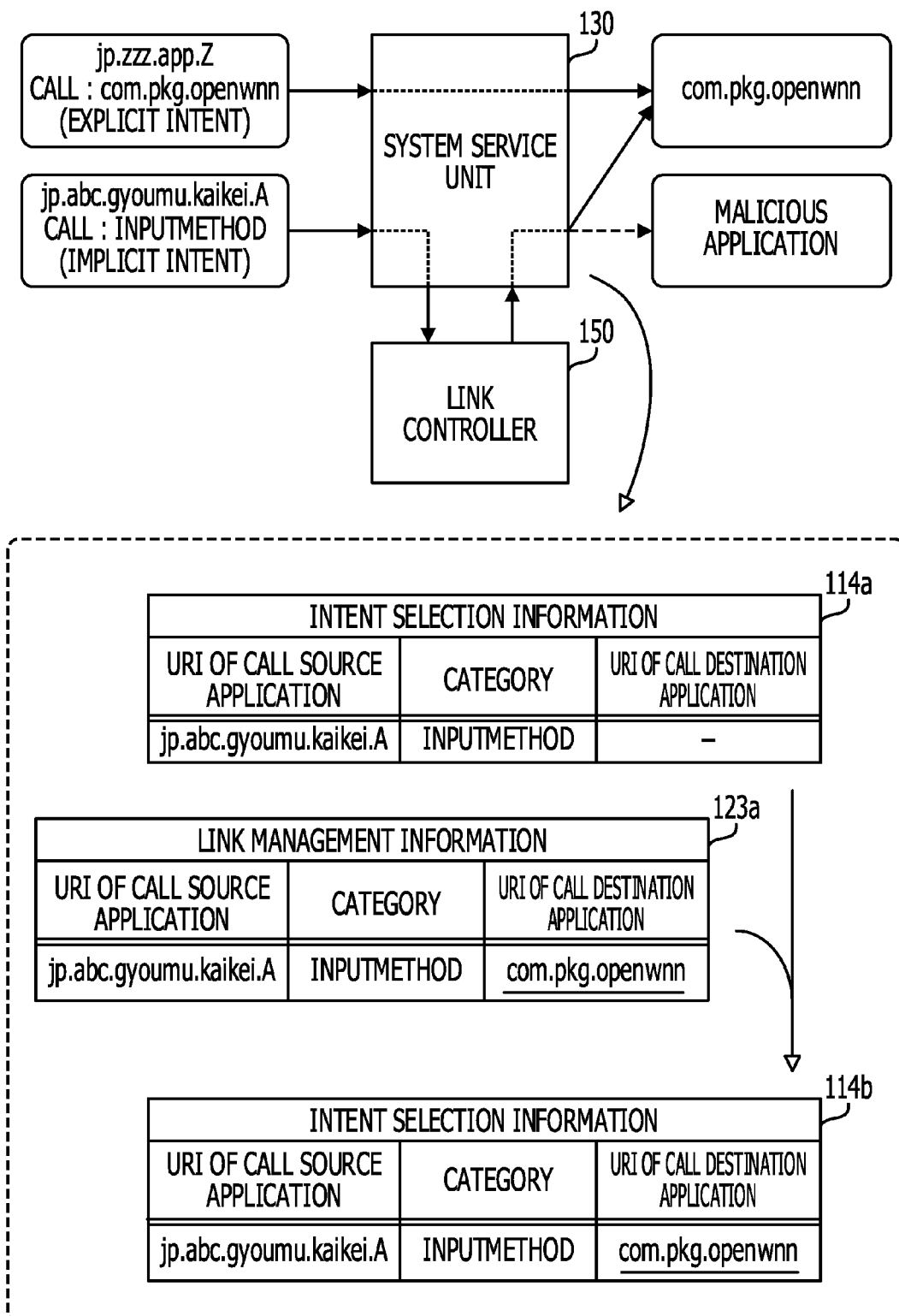
FIG. 18 is a flowchart of an example of the intent control according to the second embodiment.

FIG. 18 is a diagram illustrating an example of the intent control according to the second embodiment. FIG. 18 exemplifies two applications as call source applications. One of the two applications is a first application indicated by a URI "jp.zzz.app.Z", while the other application is a second application that is the application indicated by the URI "jp.abc.gyoumu.kaikei.A". It is assumed that calls that are placed by the two applications specify the action "ACTION_EDIT". Action items that are included in intent selection information illustrated in FIG. 18 and link management information illustrated in FIG. 18 are omitted in FIG. 18. The action items that are included in the intent selection information illustrated in FIG. 18 and the link management information illustrated in FIG. 18 indicate the action "ACTION_EDIT".

The application indicated by the URI "jp.zzz.app.Z" specifies a call destination application "com.pkg.openwnn" in an "explicit intent". The application indicated by the URI "jp.abc.gyoumu.kaikei.A" specifies a call destination application (belonging to the category "INPUTMETHOD") in an "implicit intent".

When receiving the "explicit intent" from the first application indicated by the URI "jp.zzz.app.Z", the system service unit 130 calls the application indicated by the explicitly specified URI "com.pkg.openwnn".

When receiving the "implicit intent" specifying the category "INPUTMETHOD" from the second application "jp.abc.gyoumu.kaikei.A", the system service unit 130 executes the following process.

First, the system service unit 130 references the intent selection data 114 and searches a record (intent selection information) corresponding to the received "implicit intent". Specifically, the system service unit 130 searches intent selection information that includes the URI of the call source application and the category (and the action) specified by the "implicit intent". If the intent selection information is not found, the system service unit 130 generates intent selection information 114a including the URI of the call source application and the category and transfers the process to the link controller 150.

Next, the link controller 150 searches, from the link management table 123, a record (link management information 123a) that includes the URI of the call source application and the specified category. The link controller 150 extracts the call destination application URI "com.pkg.openwnn" registered in the link management information 123a. The link controller 150 sets the URI of the call destination application in the intent selection information 114a. The set record is intent selection information 114b. The link controller 150 returns the process to the system service unit 130.

The system service unit 130 selects a call destination on the basis of the intent selection data 114 for the "implicit intent" provided by the second application indicated by the URI "jp.abc.gyoumu.kaikei.A". Specifically, the system service unit 130 references the intent selection information 114b and the selects the call destination application indicated by the URI "com.pkg.openwnn". Thus, even if an application (also referred to as malicious application) that executes a malicious process exists as a candidate for the destination of the call specifying the category "INPUTMETHOD", the malicious application may be inhibited from being selected by the user.

Figure 19:
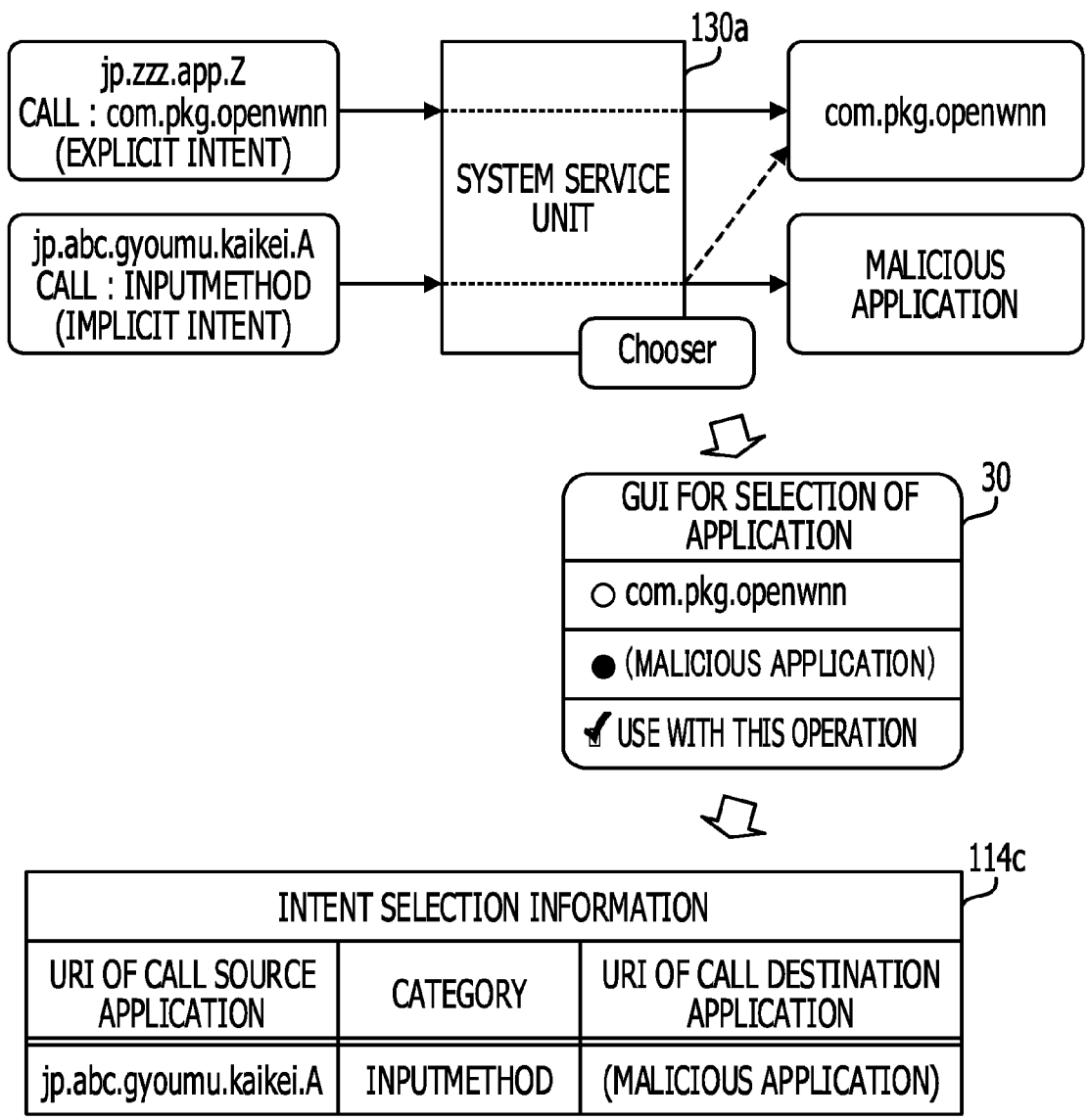
FIG. 19 is a diagram illustrating a comparative example of intent control.

FIG. 19 is a diagram illustrating a comparative example of intent control. FIG. 19 exemplifies intent control in the case where the information processing according to the second embodiment is not executed. A system service unit 130a corresponds to the system service unit 130 according to the second embodiment, but does not coordinate with link controller 150. For other units according to the comparative example, names and reference symbols that are the same as the units of the mobile terminal device 100 are used for convenience. Call source applications illustrated in FIG. 19 are the same as the first and second applications illustrated in FIG. 18. It is assumed that calls that are placed by the applications illustrated in FIG. 19 specify the action "ACTION_EDIT". Action items that are included in intent selection information illustrated in FIG. 19 and link management information illustrated in FIG. 19 are omitted in FIG. 19. The action items that are included in the intent selection information illustrated in FIG. 19 and the link management information illustrated in FIG. 19 indicate the action "ACTION_EDIT".

The system service unit 130a processes an "explicit intent" provided by the first application indicated by the URI "jp.zz-z.app.Z" in the same manner as the system service unit 130 illustrated in FIG. 18.

When receiving an "implicit intent" specifying the category "INPUTMETHOD" from the second application indicated by the URI "jp.abc.gyoumu.kaikei.A", the system service unit 130a executes the following process.

First, the system service unit 130a references the intent selection data 114 and searches a record (intent selection information) corresponding to the received "implicit intent". Specifically, the system service unit 130a searches the intent selection information that includes the URI of the call source application and the category (and the action) specified by the received "implicit intent". If the searched intent selection information has, set therein, a URI of a call destination application, the system service unit 130a executes the call destination application. If the searched intent selection information does not have the URI of the call destination application, the system service unit 130a represents, to the user, applications that are candidates for a call destination, and prompts the user to select any of the applications.

In the latter case, a specific process is executed as follows. The system service unit 130a calls Chooser. Chooser generates a GUI 130 for selection of an application, causes the display 105 to display the generated GUI 130, and prompts the user to select a call destination application. For example, in the GUI 130, information that indicates a malicious application and the application that is indicated by the URI "com.pkg.openwnn" and is a candidate for the call destination is listed. In this case, the user might select the malicious application. In the GUI 130, a form that is used to set information indicating "use with this operation" may be displayed. If the information that indicates "use with this operation" is specified in the form, Chooser (or the system service unit 130a) registers, in the intent selection data 114, a record (intent selection information 114c) in which the URI of the malicious application is set as a call destination application URI.

The intent selection information that includes the URI of the call source application, the action and the category may not exist in the intent selection data 114. In this case, the intent selection information (in which a call destination application URI is not set) is newly generated and the same process as described above is executed.

If the user selects a malicious application in the GUI 130 for selection of an application, the malicious application is executed. For example, the malicious application may execute a malicious process of transmitting input information to another device without permission. Thus, private information of the user or confidential information may leak. If the setting is executed so as to ensure that the malicious application is executed for an "implicit intent" provided from the call source application, a risk such as leakage of information increases.

Thus, the mobile terminal device 100 according to the second embodiment includes the link management table 123 for an "implicit intent". If an "implicit intent" is provided, the mobile terminal device 100 sets a URI of a call destination application in the intent selection data 114 on the basis of the link management table 123. The link management table 123 is generated on the basis of the profile table 121 and the security measures table 122.

For example, the profile table 121 and the security measures table 122 may be created by an application developer, an application provider, an administrator of the information processing system, or the like. The created profile table 121 and the created security measures table 122 may be provided by the server 200 to the mobile terminal device 100.

The profile table 121 and the security measures table 122 may be created by the user of the mobile terminal device 100. In this manner, the intent control that inhibits a malicious application from being selected is executed by setting, for each of profiles, an application permitted as a call destination application. Specifically, by setting a proper call destination application in the intent selection data 114, Chooser and the like do not prompt the user to select a malicious application.

A specific application may be selected as a call destination from among an application group identified by a signal profile. For example, a specific application may be used by the user as an application providing a predetermined function for a group of accounting applications that coordinate with each other. More specifically, a specific application that provides a function for ensuring the reliability or a function of improving the operability may be used for a task supported by an application group. In this case, a call destination application permitted in the security measures table 122 is specified for a corresponding profile. Thus, the specific application may be called for an "implicit intent" by an application group.

In the aforementioned example, a permitted call destination application may be set for an application group by registering a prefix for a profile in the profile table 121. A permitted call destination application may be set for a single application. In this case, a complete URI that indicates a call source application is set in the prefix item of the profile table 121.

As described above, the information processing according to the first embodiment may be achieved by causing the computing unit 1b to execute the program. The information processing according to the second embodiment may be achieved by causing the processor 101 to execute the program. The program may be stored in a recording medium (for example, an optical disc, a memory card, or the like) that is may be read by the information processing device 1, the mobile terminal device 100, and an information processing device such as a computer.

In order to distribute the program, a portable recording medium that stores the program is provided. In addition, the program may be stored in a storage device of the computer and distributed through a network. The information processing device stores, in a storage device, the program stored in the portable recording medium or received from another computer, reads the program from the storage device, and executes the program. The information processing device may directly execute the program read from the portable recording medium or may directly execute the program received from the other computer through a network.

At least a part of the information processing may be achieved by an electronic circuit such as a DSP, an ASIC, or a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a storage that stores first information and second information, the first information associating a content of a call to be issued from a first application with information on whether to cause a user to select any of a plurality of second applications, the second information associating the content of the call to be issued from the first application with any of the second applications; and
a processor that is configured to
receive a call issued from the first application,
determine whether the received call is associated with information to cause the user to select any of the second applications based on the first information,
specify the second application associated with a content of the received call based on the second information when the received call is determined to be associated with the information to cause the user to select the second applications, and
execute the specified second application.

2. The information processing apparatus according to claim 1,
wherein the processor is configured to
obtain third information for a group to which the first application belongs, the third information associating the content of the call issued from the first application with at least one of the second applications permitted for the content of the call issued from the first application, and
generate the second information based on the third information.

3. The information processing apparatus according to claim 2,
wherein the processor is configured to
receive the first application from an external apparatus, and
generate the second information based on the third information upon receiving the first application.

4. The information processing apparatus according to claim 3,
wherein the processor is configured to
determine whether to generate the second information based on whether a providing source of the received first application matches a providing source of the first application recorded in association with the content of the call issued from the first application in the third information.

5. The information processing apparatus according to claim 2,
wherein the processor is configured to
determine whether to associate the call issued from the first application with the second application in the third information based on whether the second application in the third information has been installed.

6. The information processing apparatus according to claim 1,
wherein the first information is interpreted to associate the content of the call to be issued from the first application with the information to cause the user to select any of the second applications when any of the second applications is not associated with the content of the call to be issued from the first application in the first information,
the first information is interpreted to execute the second application associated with the content of the call to be issued from the first application when any of the second applications is associated with the content of the call to be issued from the first application in the first information, and
the processor is configured to
specify the second application associated with the received call based on the second information,
associate the content of the received call with the specified second application, and
execute the specified second application.

7. A medium that stores a program for causing an information processing apparatus to execute a process, the information processing apparatus including a storage that stores first information and second information, the first information associating a content of a call to be issued from a first application with information on whether to cause a user to select any of a plurality of second applications, the second information associating the content of the call to be issued from the first application with any of the second applications, the process comprising:
receiving a call issued from the first application;
determining whether the received call is associated with information to cause the user to select any of the second applications based on the first information,
specifying the second application associated with a content of the call received in the receiving based on the second information when the received call is determined to be associated with the information to cause the user to select any of the second applications; and
executing the second application specified in the specifying.

8. A method for controlling an information processing apparatus including a storage that stores first information and second information, the first information associating a content of a call to be issued from a first application with information on whether to cause a user to select any of a plurality of second applications, the second information associating the content of the call to be issued from the first application with any of the second applications, the method comprising:
receiving a call issued from the first application;
determining whether the received call is associated with information to cause the user to select any of the second applications based on the first information,
specifying, using a processor, the second application associated with a content of the call received in the receiving based on the second information when the received call is determined to be associated with the information to cause the user to select any of the second applications; and
executing the second application specified in the specifying.

* * * * *